(12) United States Patent
Popp

(10) Patent No.: US 7,734,130 B2
(45) Date of Patent: Jun. 8, 2010

(54) POLARIZATION-MAINTAINING OPTICAL ROTARY COUPLING

(75) Inventor: Gregor Popp, Munich (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 830 days.

(21) Appl. No.: 11/563,371

(22) Filed: Nov. 27, 2006

(65) Prior Publication Data

US 2007/0237528 A1 Oct. 11, 2007

(30) Foreign Application Priority Data

Nov. 28, 2005 (DE) .................. 10 2005 056 899

(51) Int. Cl.
*G02B 6/26* (2006.01)
*G02B 6/00* (2006.01)

(52) U.S. Cl. .................. 385/25; 385/147

(58) Field of Classification Search ........... 385/10, 385/11, 24, 25, 26, 31, 147
See application file for complete search history.

(56) References Cited

U.S. PATENT DOCUMENTS

| | | | |
|---|---|---|---|
| 4,109,998 A | 8/1978 | Iverson | |
| 4,325,584 A | 4/1982 | Christ et al. | |
| 4,641,915 A | 2/1987 | Asakawa et al. | |
| 4,725,116 A | 2/1988 | Spencer et al. | |
| 4,858,292 A | 8/1989 | Buhlmann et al. | |
| 4,872,737 A | 10/1989 | Fukahori et al. | |
| 5,115,481 A | 5/1992 | Buhrer | |
| 5,157,745 A | 10/1992 | Ames | |
| 5,271,076 A | 12/1993 | Ames | |
| 5,317,659 A | 5/1994 | Lee | |
| 5,442,721 A | 8/1995 | Ames | |
| 5,568,578 A | 10/1996 | Ames | |
| 5,588,077 A * | 12/1996 | Woodside | 385/26 |
| 6,192,175 B1 | 2/2001 | Li et al. | |
| 6,236,787 B1 | 5/2001 | Laughlin | |
| 6,263,133 B1 | 7/2001 | Hamm | |
| 6,360,032 B1 | 3/2002 | Berger et al. | |
| 6,782,160 B2 * | 8/2004 | Townsend et al. | 385/25 |
| 6,823,142 B1 * | 11/2004 | Tanaka et al. | 398/152 |

(Continued)

FOREIGN PATENT DOCUMENTS

AT 410603 6/2003

(Continued)

OTHER PUBLICATIONS

Hecht, Optik, © 1974 Addison-Wesley Publishing, 8 pages.

(Continued)

*Primary Examiner*—Akm E Ullah
(74) *Attorney, Agent, or Firm*—Kevin L. Daffer; Daffer McDaniel, LLP

(57) ABSTRACT

An optical rotating data transmission device for polarization-maintaining transmission of linearly polarized light comprises at least one first collimator for coupling on first light-waveguides, and also a second collimator for coupling on second light-waveguides, the second collimator being supported to be rotatable relative to the first collimator about a rotation axis. At least two λ/4 plates for converting linear polarization to circular polarization and vice-versa are provided in an optical path between the first collimator and the second collimator.

20 Claims, 2 Drawing Sheets

U.S. PATENT DOCUMENTS

| | | |
|---|---|---|
| 6,862,383 B2 | 3/2005 | Kikuchi et al. |
| 7,076,131 B2 | 7/2006 | Bolle |
| 7,142,747 B2 * | 11/2006 | Oosterhuis et al. ............ 385/26 |
| 7,239,776 B2 | 7/2007 | Oosterhuis et al. |
| 7,246,949 B2 | 7/2007 | Thiele et al. |
| 7,298,538 B2 | 11/2007 | Guynn et al. |
| 7,352,929 B2 | 4/2008 | Hagen et al. |
| 7,372,230 B2 | 5/2008 | McKay |
| 7,373,041 B2 | 5/2008 | Popp |
| 7,433,556 B1 | 10/2008 | Popp |
| 2002/0094163 A1 | 7/2002 | Ooyama et al. |
| 2003/0099454 A1 | 5/2003 | Chang |
| 2004/0017984 A1 | 1/2004 | Thiele et al. |
| 2005/0036735 A1 | 2/2005 | Oosterhuis et al. |
| 2005/0119529 A1 | 6/2005 | Farr et al. |
| 2006/0110092 A1 * | 5/2006 | Ikeda ........................ 385/11 |
| 2007/0019908 A1 | 1/2007 | O'Brien et al. |
| 2007/0053632 A1 | 3/2007 | Popp |
| 2008/0106711 A1 | 5/2008 | Beierl et al. |
| 2008/0175535 A1 | 7/2008 | Popp et al. |
| 2008/0226231 A1 | 9/2008 | Popp |
| 2008/0317407 A1 * | 12/2008 | Popp et al. .................... 385/26 |

FOREIGN PATENT DOCUMENTS

| | | |
|---|---|---|
| DE | 1300002 | 7/1969 |
| DE | 1575515 | 3/1970 |
| DE | 74062 | 6/1970 |
| DE | 1772492 | 2/1972 |
| DE | 3207469 | 9/1982 |
| DE | 19809823 | 9/1999 |
| DE | 20105786 | 7/2001 |
| DE | 69704782 | 11/2001 |
| DE | 10029206 | 1/2002 |
| DE | 102004026498 | 12/2005 |
| DE | 60019966 | 2/2006 |
| DE | 102006022023 | 11/2006 |
| DE | 102005056899 | 5/2007 |
| EP | 0490054 | 6/1992 |
| EP | 0588039 | 3/1994 |
| EP | 1345051 | 9/2003 |
| EP | 1359452 | 11/2003 |
| EP | 1476969 | 7/2005 |
| GB | 2005044 | 4/1979 |
| JP | 63208821 | 8/1988 |
| JP | 2113213 | 4/1990 |
| JP | 2141708 | 5/1990 |
| WO | 01/98801 | 12/2001 |
| WO | 03/069392 | 8/2003 |

OTHER PUBLICATIONS

Schleifring, "Mikrooptischer Dreguebertrager," 2005, 12 pages.
U.S. Appl. No. 11/962,333, filed Dec. 21, 2007.
Office Action mailed Jul. 8, 2008 for U.S. Appl. No. 12/045,965.
Final Office Action mailed Mar. 16, 2009 for U.S. Appl. No. 12/045,965.
Office Action mailed Apr. 3, 2009 for U.S. Appl. No. 12/144,106.
Office Action mailed Apr. 5, 2007 for U.S. Appl. No. 11/469,004.
Notice of Allowance mailed Oct. 10, 2007 for U.S. Appl. No. 11/469,004.
Notice of Allowance mailed Jan. 7, 2008 for U.S. Appl. No. 11/469,004.
Office Action mailed Feb. 22, 2008 for U.S. Appl. No. 11/766,361.
Notice of Allowance mailed Jul. 14, 2008 for U.S. Appl. No. 11/766,361.
Office Action Mailed Aug. 28, 2009 for U.S. Appl. No. 12/045,965.
Final Office Action Mailed Aug. 26, 2009 for U.S. Appl. No. 12/144,106.
Notice of Allowance mailed Jan. 12, 2010 for U.S. Appl. No. 12/045,965.

* cited by examiner

POLARIZATION-MAINTAINING OPTICAL ROTARY COUPLING

CONTINUING DATA

The captioned application claims priority to German Application No. 102005056899.8 filed Nov. 28, 2005.

BACKGROUND OF THE INVENTION

1. Field of the Invention

The invention relates to a device for polarization-maintaining transmission of optical signals between units that are rotatable relative to each other (rotary coupling). This is intended preferably for simultaneous transmission of a plurality of optical signals along a plurality of channels.

2. Description of the Prior Art

Particularly with high bit-rate transmission systems having data rates of 40 Gbit/s and higher, transmission is effected in a polarization-maintaining manner. Here light is transmitted preferably at a defined linear polarization. Polarized light is also employed with various optical sensors. Thus, a change of the polarization of the light can be evaluated by means of measured parameters. Optical signals of this kind must frequently be transmitted between units that are rotatable relative to each other.

Various transmission systems are known for basic transmission of optical signals between units that are rotatable relative to each other.

U.S. Pat. No. 5,568,578 discloses an optical rotating data transmission device for a plurality of channels, the device comprising a Dove prism. The polarization of coupled-in light changes with a rotation of the two units relative to each other. Furthermore, no transmission of light is possible at constant polarization even with employed components such as light-guiding fibers or collimators.

EP 1476969 discloses a rotating data transmission device in which the light is transmitted by multiple reflections in mirror-coated trench. The polarization of the incident light is changed in an unpredictable manner by the number of reflections which varies according to position.

BRIEF SUMMARY OF THE INVENTION

The invention is based on the object of designing a rotary data transmission device for transmitting optical signals in such manner that light of a defined, approximately linear polarization can be transmitted from a first unit to a second unit whilst its polarization is maintained.

It is another object of the invention is to minimize position-dependent attenuations that depend upon polarization.

It is another object of the invention to provide a method for polarization-maintaining transmission of linearly polarized light between a first unit and a second unit that is rotatable relative to the first unit.

The invention provides a polarization-maintaining optical rotary data transmission device for transmitting linearly polarized light, comprising: at least one first collimator coupled onto first light-waveguides; a second collimator coupled onto second light-waveguides and supported to be rotatable relative to the first collimator about an axis of rotation; and an optical path passing between the first collimator and the second collimator; wherein at least one first polarization converter is disposed in the optical path to rotate jointly with the first collimator, for converting light of linear polarization to light of circular polarization; and a second polarization converter is disposed in the optical path to rotate jointly with the second collimator, for converting light of circular polarization to light of linear polarization.

Furthermore, the invention provides a method for polarization-maintaining transmission of linearly polarized light between a first unit and a second unit that is rotatable relative to the first unit, comprising the steps of: (1) collimating linearly polarized light with a first collimator of the first unit; (2) converting linearly polarized light to circularly polarized light with a first polarization converter assigned to the first unit; (3) coupling the light by free space propagation from the first unit to the second unit; (4) converting circularly polarized light to linearly polarized light with a second polarization converter assigned to the second unit; and (5) collimating linearly polarized light with a second collimator of the second unit.

BRIEF DESCRIPTION OF THE DRAWINGS

In the following the invention will be described by way of example without limitation of the general inventive concept on examples of embodiment and with reference to the drawings.

DETAILED DESCRIPTION OF PREFERRED EMBODIMENTS

Figure 1:
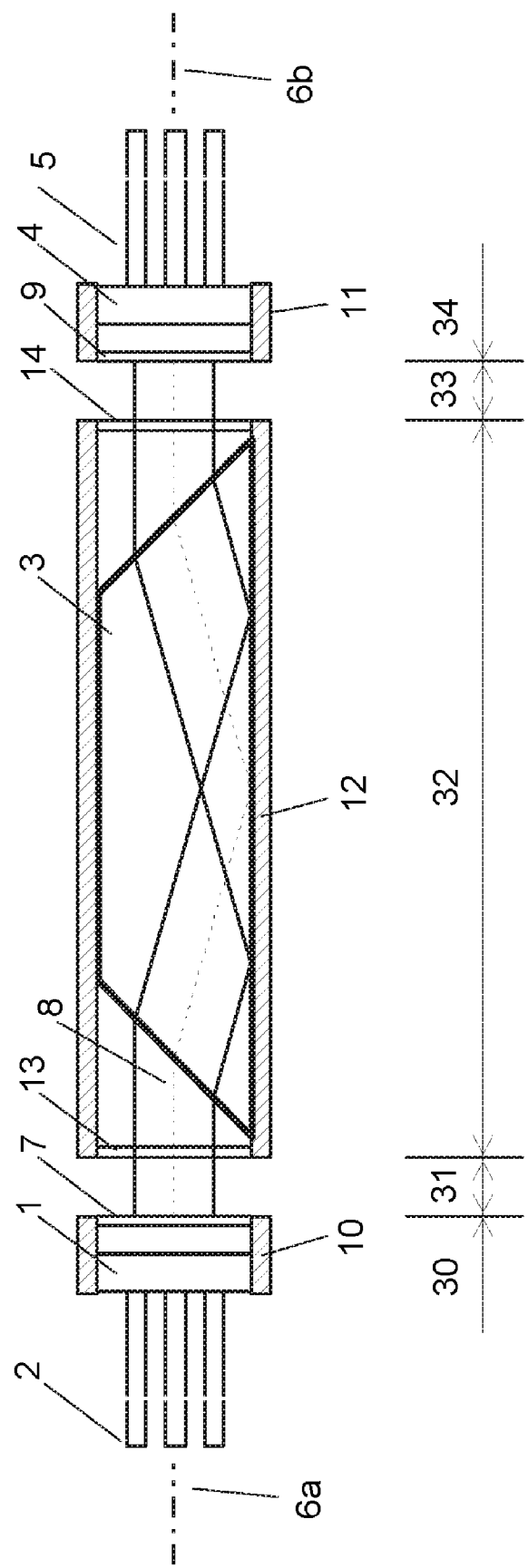
FIG. 1 schematically shows in a general form an arrangement for multiple channel transmission in accordance with the invention.

FIG. 1 shows in a schematic form a cross-section through an arrangement for multiple channel transmission in accordance with the invention. The optical rotating data transmission device comprises a first collimator 1 for coupling on light-waveguides 2, and also a second collimator 4 for coupling on second light-waveguides 5. The second collimator 4 is supported to be rotatable relative to the first collimator 1 around a rotation axis 6a, 6b (here also referred to as a z-axis). Here the rotation axis 6 is indicated by the two line segments 6a and 6b and has not been drawn so as to pass through the entire rotating data transmission device. A derotating element 3 is located in the beam path between a first collimator 1 and a second collimator 4 to compensate the rotary movement. Here the derotating element comprises a Dove prism, for example. This is rotated with one half of the angular velocity of the movement between the first and the second collimator. Furthermore, a first $\lambda/4$ plate 7 is provided for converting the linearly polarized light from the first light-waveguide 2. This plate is accommodated in a first retainer together with the first collimator. The light is converted to light of circular polarization.

In accordance with the invention, any other desired polarization converters also may be employed instead of the $\lambda/4$ plate here described by way of example. A third $\lambda/4$ plate 13 and a fourth $\lambda/4$ plate 14 are mounted respectively in front of and behind the derotating optical element 3 by means of a prism retainer 12. These rotate synchronously with the Dove prism. The light is converted back to light of linear polarization by the third $\lambda/4$ plate 13. For this, the direction of polarization is chosen so that the light may be transmitted through the Dove prism (or another derotating element) with a minimum of attenuation. Because the $\lambda/4$ plates are moved together with the prism, light of the same polarization always enters into the prism irrespective of its position. Therefore, the light also always can be transmitted with the same attenuation irrespective of the position. This is of particular importance when the attenuation is strongly dependent upon polarization, as is the case, for example, with reflection at mirror-finished surfaces, as occur particularly on Abbe-König prisms.

With this, the disadvantage of polarization-dependent attenuation of anti-reflection coatings on rotating components, in particular on the derotating element, can be avoided. Special polarization-dependent anti-reflection coatings are no longer necessary. After passing through the derotating element, the light of linear polarization is converted back to light of circular polarization by the fourth λ/4 plate 14. In a simplified embodiment, the third λ/4 plate 13 and the fourth λ/4 plate 14 also may be dispensed with. Finally, the circularly polarized light is converted back to linearly polarized light by a second λ/4 plate 9 and can then be coupled into the second light-waveguide 5 via second collimators 4. For the sake of clarity the regions of different polarizations have been indicated below the illustration of the optical system. Thus, the light is linearly polarized in the regions 30, 32 and 34, and circularly polarized in the regions 31 and 33. Of course, light may be also transmitted in a direction counter to that described here. Similarly, a plurality of light rays may be simultaneously transmitted in opposite directions.

Figure 2:
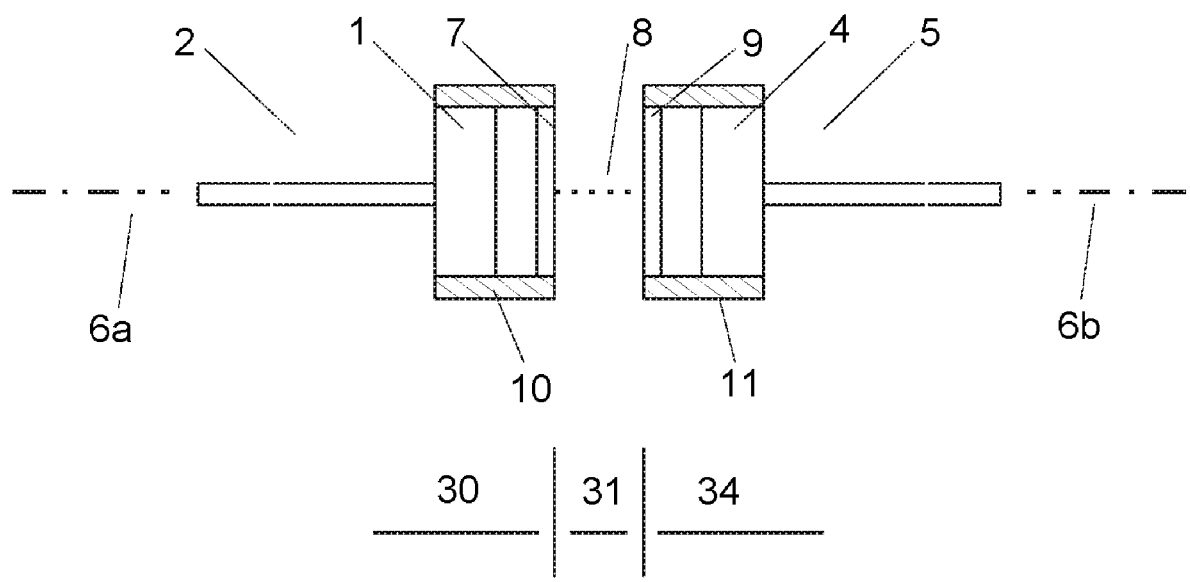
FIG. 2 schematically shows in a general form an arrangement for single channel transmission in accordance with the invention.

FIG. 2 shows an optical rotating data transmission device with only one optical path on the axis of rotation. It corresponds to the previously illustrated rotating data transmission device, but the entire structural assembly around the derotating optical element is not needed.

The device in accordance with the invention has at least two collimators 1, 4 disposed to be rotatable relative to each other about an axis 6. An optical path 8 for transmitting light is present between at least one first collimator 1 and at least one second collimator 4 that is disposed to be rotatable relative to the first collimator. At least two polarization converters 7, 9, preferably designed to be lambda/4 (λ/4) plates and respectively assigned to the first collimator 1 and the second collimator 4, are located in the path of light rays along the optical path. In the following exposition the term λ/4 plates will be used for reasons of clarity of presentation. However, in accordance with the invention any desired polarization converters may be used which cause a suitable polarization conversion (linear→circular, circular→linear) of the light to be transmitted. These may be also active optical systems based on liquid crystals or even photon crystals, for example.

Light of linear polarization coupled in by a first collimator 1 through a λ/4 plate is converted to light of circular polarization. This circular polarization is invariant with respect to a rotation of the arrangement. The first λ/4 plate 7 is connected to the first collimator 1 to rotate jointly therewith. Before entering the second collimator 4 the light of circular polarization is converted back to light of linear polarization by a second λ/4 plate. The second λ/4 plate 9 is connected to the second collimator 4 to rotate jointly therewith, and is thus adapted to rotate together with this collimator relative to the first λ/4 plate 7 together with the first collimator 1.

Here λ/4 plates are understood to be thin plates of doubly refracting material, such as quartz, mica, or organic polymers. The thickness of the plates is chosen so that a plate introduces a relative phase shift of $\Delta_\varphi = \pi/2$ between the orthogonal o- and e-components of a wave. This phase shift of 90° converts linearly polarized light to elliptically polarized light and vice versa. In particular, linearly polarized light which is incident at an angle of 45° to one of the two major axes of a plate of this kind is converted to circularly polarized light. In this case, the amplitudes of the o- and e-components are identical. Similarly, a circularly polarized light beam is converted to a linearly polarized light beam. As a rule, λ/4 plates are designed for given wavelengths. However, they may be made to be of broader bandwidth, or designed for a plurality of wavelengths by combining plates of different materials. Thus, suitable plates for different wavelengths may also be disposed in series.

Here the term collimator is used in its broadest sense for a beam-guiding or beam-shaping element. The purpose of a collimator of this kind consists of converting the light guided in a light-waveguide, for example a single-mode fiber or also a multiple-mode fiber, to form a path of rays that can be passed through the rotating data transmission device, and in particular through the derotating element. This corresponds to a path of rays in a free space, or in an optical medium such as a gas or oil, for example. Similarly, a conversion in the opposite direction, i.e. from a path of rays in a rotating data transmission device to a light-waveguide, may be effected with a collimator. Of course, conversions in both directions inside a collimator are conceivable. A collimator may be achieved in the form of a single optical component, for example a lens, preferably a spherical lens, or even a GRIN lens, or a fiber length. Similarly, a collimator may be also a micro-optical component. Furthermore, a plurality of collimators may be assembled to form a collimator array. Especially advantageous is a combination of an array of this kind with other mechanical and/or optical components, for example for mounting the light-guiding fibers, or with a derotating element such as one or a plurality of λ/4 plates.

Basically the arrangements in accordance with the invention may be operated in both directions, i.e. from the first collimator to the second collimator or vice versa, but also bidirectionally. In the following, reference will also be made to light-entry faces, coupling-in of light etc. for the sake of simpler illustration. It is self-evident that in the case of a reversed direction of transmission these terms will apply to the corresponding light exit faces etc.

In accordance with the invention, one or a plurality of hollow spaces on the inside of the arrangement may be filled with air, a gas, or even a liquid such as oil. Accordingly, the term of free space propagation will also apply to one or a combination of these media. Optionally, in the case of an active optical medium the medium may perform the function of a polarization converter.

In a particularly advantageous embodiment of the invention, at least one derotating optical element 3 is located in the optical path 8 to image the light emitted by a first collimator 1 onto a second collimator 4, and similarly in the opposite direction, independently from the rotary movement between the two collimators. A derotating element of this kind may be, for example, a Dove prism or an Abbe-König prism. With a derotating element of this kind, optical signals having an optical path which is not identical with the axis of rotation may be transmitted. With this, a arrangement of this kind is particularly suitable for simultaneous transmission of a plurality of optical signals.

Another advantageous embodiment of the invention provides further λ/4 plates 13, 14 that are assigned to the derotating element 3 and rotate together therewith. Thus the circularly polarized light may be converted back to linear polarization before entering the derotating element. For this, a direction of polarization is preferably chosen which can be transmitted through the derotating element with the smallest losses.

In another advantageous embodiment of the invention, a coupling onto the collimators 1, 4 is effected by means of polarization-maintaining fibers. Similarly, direct coupling-in, for example with a laser, would also be possible.

In another advantageous embodiment, a device in accordance with the invention is equipped with at least one collimator arrangement 1, 4 that comprises a plurality of collimators in one unit, preferably a monolithic unit. A unit of this kind preferably consists of micro-optical components.

In order that reflections may be reduced, at least one λ/4 plate 7, 9, 13, 14 has an anti-reflection coating.

Furthermore, advantageously at least one λ/4 plate 7, 9, 13, 14 is tilted to be oblique to the incident beam of light. For this, the wavelength for which the plate is designed must be conformed because of the resulting larger layer thickness.

Another embodiment provides for at least two λ/4 plates 7, 9, 13, 14 of different materials to be disposed in series for transmission of a plurality of wavelengths.

A method in accordance with the invention for polarization-maintaining transmission of linearly polarized light between a first unit 1, 2, 7, 10 and a second unit 4, 5, 9, 11 that is rotatable relative to the first unit comprises the following steps:
- (1) collimating linearly polarized light with a first collimator 1 of the first unit;
- (2) converting linearly polarized light to circularly polarized light, preferably with at least one λ/4 plate 7 assigned to the first unit;
- (3) coupling the light by free space propagation from the first unit to the second unit;
- (4) converting circularly polarized light to linearly polarized light, preferably with at least one λ/4 plate 9 assigned to the second unit;
- (5) collimating linearly polarized light with a second collimator 2 of the second unit.

An advantageous further development of the method comprises the following steps instead of the step (3):
- (3a) coupling the light by free space propagation from the first unit to a derotating optical element 3;
- (3b) derotating the light with a derotating optical element 3, such as for example a Dove prism, that rotates with one half of the angular velocity between the first and the second unit;
- (3c) coupling the light from the derotating element 3 by free space propagation to the second unit.

Another advantageous development of the method comprises the following steps instead of the step (3):
- (3a) coupling the light by free space propagation from the first unit to a third λ/4 plate 13;
- (3b) converting circularly polarized light to linearly polarized light, preferably with at least one third λ/4 plate 13 that is moved together with the derotating optical element 3;
- (3c) derotating the light with a derotating optical element 3, such as for example a Dove prism, that rotates with one half of the angular velocity between the first and the second unit;
- (3d) converting linearly polarized light to circularly polarized light, preferably with at least one fourth λ/4 plate 14 that is moved together with the derotating optical element 3;
- (3e) coupling the light from a fourth λ/4 plate 14 to the second unit by free space propagation.

The invention claimed is:

1. A polarization-maintaining optical rotary data transmission device for transmitting linearly polarized light, comprising:
   at least one first collimator coupled onto first light-waveguides;
   a second collimator coupled onto second light-waveguides and supported to be rotatable relative to the first collimator about an axis of rotation;
   an optical path passing between the first collimator and the second collimator;
   wherein at least one first polarization converter is disposed in the optical path to rotate jointly with the first collimator, for converting light of linear polarization to light of circular polarization; and
   wherein a second polarization converter is disposed in the optical path to rotate jointly with the second collimator, for converting light of circular polarization to light of linear polarization.

2. The device according to claim 1, wherein at least one of the polarization converters comprises a λ/4 plate.

3. The device according to claim 1, wherein at least one derotating optical element is provided in the optical path between at least one first collimator and at least one second collimator.

4. The device according to claim 3, wherein further polarization converters are provided ahead of and following the derotating element, and are adapted to rotate jointly with the derotating element.

5. The device according to claim 4, wherein the further polarization converters are λ/4 plates.

6. The device according to claim 1, wherein the light-waveguides are polarization-maintaining fibers.

7. The device according to claim 1, wherein a plurality of collimators are arranged to form a collimator unit.

8. The device according to claim 7, wherein the collimator unit is a monolithic unit.

9. The device according to claim 8, wherein the monolithic unit comprises at least one micro-optical component.

10. The device according to claim 2, wherein at least one λ/4 plate has an anti-reflection coating.

11. The device according to claim 2, wherein at least one λ/4 plate is tilted to be oblique to an incident light beam.

12. The device according to claim 2, wherein at least two λ/4 plates made of different materials are disposed in series to transmit a plurality of wavelengths.

13. A method for polarization-maintaining transmission of linearly polarized light between a first unit and a second unit that is rotatable relative to the first unit comprising the steps of:
   (1) collimating linearly polarized light with a first collimator of the first unit;
   (2) converting linearly polarized light to circularly polarized light with a first polarization converter assigned to the first unit;
   (3) coupling the light by free space propagation from the first unit to the second unit;
   (4) converting circularly polarized light to linearly polarized light with a second polarization converter assigned to the second unit; and
   (5) collimating linearly polarized light with a second collimator of the second unit.

14. The method according to claim 13, wherein at least one polarization converter is at least one λ/4 plate.

15. Method for polarization-maintaining transmission of linearly polarized light between a first unit and a second unit that is rotatable relative to the first unit, comprising the steps of:
   (1) collimating linearly polarized light with a first collimator of the first unit;
   (2) converting linearly polarized light to circularly polarized light with a first polarization converter assigned to the first unit;

(3) coupling the light by free space propagation from the first unit to a derotating optical element;

(4) derotating the light with a derotating optical element that rotates with one half of the angular velocity between the first and the second unit;

(5) coupling the light from the derotating element by free space propagation to the second unit;

(6) converting circularly polarized light to linearly polarized light with a second polarization converter assigned to the second unit; and (7) collimating linearly polarized light with a second collimator of the second unit.

16. The method according to claim 15, wherein at least one polarization converter is at least one λ/4 plate.

17. The method according to claim 15, wherein the derotating element is a Dove prism.

18. Method for polarization-maintaining transmission of linearly polarized light between a first unit and a second unit that is rotatable relative to the first unit comprising the steps of:

(1) collimating linearly polarized light with a first collimator of the first unit;

(2) converting linearly polarized light to circularly polarized light with a first polarization converter assigned to the first unit;

(3) coupling the light by free space propagation from the first unit to a third polarization converter;

(4) converting circularly polarized light to linearly polarized light with the third polarization converter that is moved together with the derotating optical element;

(5) derotating the light with a derotating optical element that rotates with one half of the angular velocity between the first and the second unit;

(6) converting linearly polarized light to circularly polarized light with a fourth polarization converter that is moved together with the derotating optical element;

(7) coupling the light from a fourth λ/4 plate to the second unit by free space propagation;

(8) converting circularly polarized light to linearly polarized light with a second polarization converter assigned to the second unit; and (9) collimating linearly polarized light with a second collimator of the second unit.

19. The method according to claim 18, wherein at least one polarization converter is at least one λ/4 plate.

20. The method according to claim 18, wherein the derotating element is a Dove prism.

* * * * *